United States Patent [19]

Brotcke

[11] Patent Number: 4,951,702
[45] Date of Patent: Aug. 28, 1990

[54] BIDET VALVE

[75] Inventor: John J. Brotcke, Germantown, Wis.

[73] Assignee: Canceramic Limited, Tortola, British Virgin Isls.

[21] Appl. No.: 399,582

[22] Filed: Aug. 28, 1989

[51] Int. Cl.⁵ ............................................. F16K 24/02
[52] U.S. Cl. ....................................... 137/218; 4/443; 137/269; 137/597; 137/625.11
[58] Field of Search ...................... 137/625.11, 625.46, 137/218, 269, 597, 625.41; 4/443, 444, 445, 446, 447, 448, 420.2

[56] References Cited

U.S. PATENT DOCUMENTS

| | | | |
|---|---|---|---|
| 4,326,671 | 4/1982 | Goguen | 137/625.46 X |
| 4,589,438 | 5/1986 | Breda | 137/218 |
| 4,609,007 | 9/1986 | Uhl | 137/625.41 X |
| 4,646,775 | 3/1987 | Traylor | 137/269 X |
| 4,874,006 | 10/1989 | Iqbal | 137/597 X |

FOREIGN PATENT DOCUMENTS 8200696 3/1982 PCT Int'l Appl. ............ 137/625.11

*Primary Examiner*—Stephen M. Hepperle
*Attorney, Agent, or Firm*—Nilles & Nilles

[57] ABSTRACT

A non-rise bidet valve comprising a housing having a fluid inlet and first and second discharge openings; a fluid diverting chamber having a fluid admitting opening and first and second outtake ports; a fluid passage connecting the fluid inlet in open fluid communication with the fluid admitting opening of the diverting chamber; a first fluid outlet passage connecting the first outtake port with the first discharge opening; a second fluid outlet passage connecting the second outtake port with a second discharge passage; and a diverter member mounted in the diverting chamber for movement between first and second positions. The diverter member has a stem presenting an exterior portion extending outside of the housing for moving the diverter member between the first and second positions and seals are provided on the diverter member for movement therewith to close the fluid outtake ports to provide for selective diversion of fluid entering said diverting chamber to either the first or second discharge openings during use. The bidet valve also has an integral vacuum breaker valve which is in a vacuum breaker stem chamber that has an air inlet connecting the stem chamber in open communication with atmosphere. The stem chamber has a stem chamber outlet that connects the stem chamber in fluid communication with the diverting chamber. A vacuum breaker poppet valve is mounted in the housing for movement into open or closed closing relation with the air inlet.

11 Claims, 3 Drawing Sheets

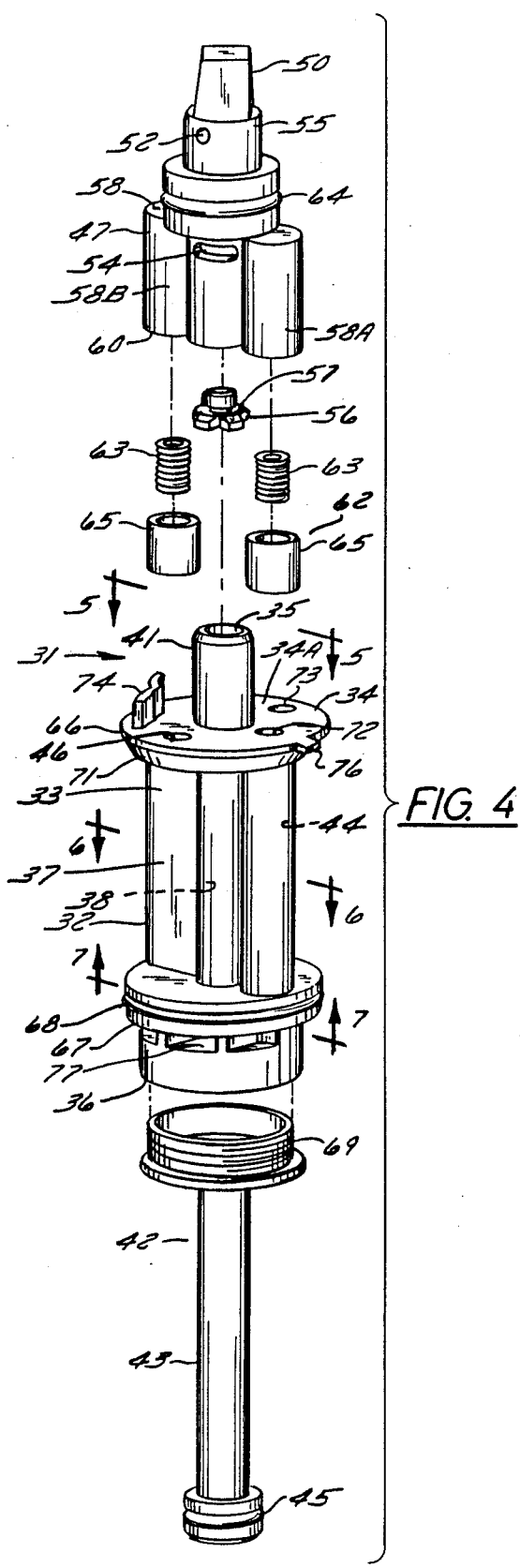
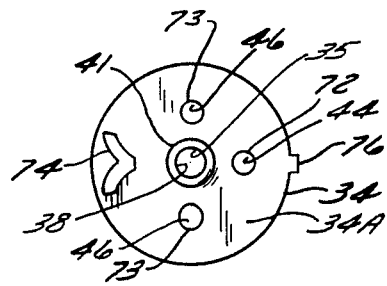
FIG. 5
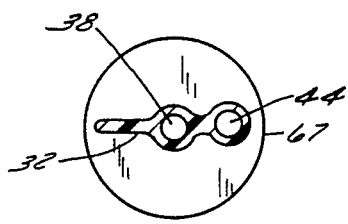
FIG. 6
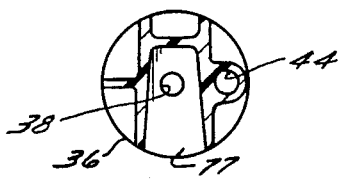
FIG. 7

BIDET VALVE

BACKGROUND OF THE INVENTION

1. Field of the Invention

This invention relates to a non-rise bidet valve and more particularly to a bidet valve having an integral vacuum breaker to prevent reverse flow siphoning of unpotable fluid back through the bidet valve.

2. Description of the Prior Art

Bidet valves of the above type are generally connected in fluid receiving relation with the output of conventional hot and cold water valves. The bidet valve blends the hot and cold water and then supplies the blended water to either a first or a second discharge opening connected, respectively, to a bidet spray head in a center bottom region of the bidet bowl or to a passage in a circumferential rim of the bidet bowl from which it passes through small openings to provide a rim wash of the bidet bowl. Operation of the bidet valve permits a selective sequential diversion of the incoming blended water, usually first to the center spray head and then to the bowl rim channel to provide the rim wash to cleanse the bidet bowl after use. Because of the need to provide for diversion of the incoming water to separate discharge openings, existing diverter valves have been complex in design and thus more expensive to manufacture and service.

Another problem arises with prior bidet valves because applicable plumbing codes frequently require that a separate vacuum breaking valve mechanism of some type be installed in the water supply lines of the bidet installation to prevent malfunction in the water supply system from creating a suction that could cause siphoning of unpotable fluid from the bidet bowl back into the potable water supply lines. For sake of convenient reference, such valve mechanisms will be referred to as vacuum breakers. To comply with such codes, prior practice has been to install a separate vacuum breaker valve in the water supply to the bidet valve to provide an air inlet that will admit atmospheric air at a critical level above the bidet rim. The addition of a separate vacuum breaker can add over two hundred dollars to the cost of the bidet fittings alone and connecting such a separate vacuum breaker in the bidet installation increases the labor costs.

A further disadvantage in prior art installations arises when service is required and in such event the service personnel must test both the bidet valve and the separate vacuum breaker. The complex design makes disassembly and service of two valve components more difficult and costly, and with such prior art designs it was not possible to quickly service the bidet valve and vacuum breaker.

The problem which prior art designs do not solve is to provide a non-rise bidet valve which is simple in design and low in cost to manufacture. Further, the valve should be instantly convertible to vacuum breaker or non-vacuum breaker operation to avoid the necessity of providing a separate vacuum breaker in the bidet installation and yet be easily and quickly serviced.

SUMMARY OF THE INVENTION

It is an object of this invention to provide a non-rise bidet valve which is simple in design, low in cost to manufacture and assemble, reliable in operation, and easy to service.

It is another object of this invention to provide a bidet valve incorporating a vacuum breaker valve therein.

It is another object of this invention to provide a bidet valve that is convertible to vacuum breaker or non-vacuum breaker operation.

It is a further object of this invention to provide a replacement cartridge incorporating a vacuum breaker for a bidet valve to provide for quick and easy servicing thereof.

The bidet valve comprises a housing having fluid inlet means and first and second discharge openings; a fluid diverting chamber having a fluid admitting opening and first and second outtake ports; a fluid passage connecting the fluid inlet means in open fluid communication with the fluid admitting opening of the diverting chamber; a first fluid outlet passage connecting the first outtake port with the first discharge opening; a second fluid outlet passage connecting the second outtake port with a second discharge passage; and a diverter member mounted in the diverting chamber for movement between first and second positions. The diverter member has a stem presenting an exterior portion extending outside of the housing for moving the diverter member between the first and second positions and seal means is provided on the diverter member for movement therewith to close one of the fluid outtake ports and open the other of the outtake ports when said diverter member is in a first position, and to close the other of the fluid outtake ports and open said one outtake port when the diverter member is moved to the second position to enable selective diversion of fluid entering said diverting chamber to either the first or second discharge openings during use.

Preferably the bidet valve has an integral vacuum breaker valve. More specifically the diverter member includes a vacuum breaker stem chamber having an air inlet connecting the stem chamber in open communication with atmosphere. The stem chamber has a stem chamber outlet that connects the stem chamber in fluid communication with the diverting chamber. A vacuum breaker valve is mounted in the housing for movement into closing relation with the air inlet in response to fluid pressure in the diverting chamber and into open relation relative to the air inlet to admit atmospheric air into the stem chamber and diverting chamber in response to vacuum at the fluid admitting opening to prevent reverse flow siphoning of fluid from the first and second discharge openings back through either the first or second outtake ports.

The invention also comprises a replaceable cartridge for insertion into the axially extending bore of a bidet valve housing for control of fluid flowing through the valve housing. The replaceable cartridge comprises a spool element including a body portion having an axial extent and first and second ends; a fluid outlet zone between the first and second ends; a diverting zone adjacent the first end; a first duct projecting axially away from the first end into the diverting zone; an inlet zone adjacent the second end; a second duct projecting axially away from the second end and into the inlet zone and having a first discharge opening; a fluid inlet passage in the body portion in fluid communication between the diverting zone and the inlet zone; a first fluid outlet passage connected in fluid communication between the diverting zone and the first discharge opening; a second fluid outlet passage connected in fluid communication between the diverting zone and the fluid outlet zone; a diverter member rotatably mounted on the body portion in the diverting zone in facing relation to the first end and having a stem means for rotating the diverter member, a vacuum breaker chamber, and air inlet into said vacuum breaker chamber, a vacuum breaker outlet opening connecting the vacuum breaker chamber with the diverting zone; a seal means on the diverting member for alternately closing either the first or the second fluid outlet passages; and a vacuum breaker valve mounted in the vacuum breaker valve chamber for movement into closing relation with the air inlet.

BRIEF DESCRIPTION OF THE DRAWINGS

FIG. 4 is an exploded isometric projection view of a replaceable cartridge container in the bidet valve shown in FIGS. 1 and 3;

FIG. 5 is a cross sectional view taken along line 5—5 of FIG. 4;

FIG. 6 is a cross sectional view taken along line 6—6 of FIG. 4;

FIG. 7 is a cross sectional view taken along line 7—7 of FIG. 4; and

DESCRIPTION OF THE PREFERRED EMBODIMENTS

Figure 1:
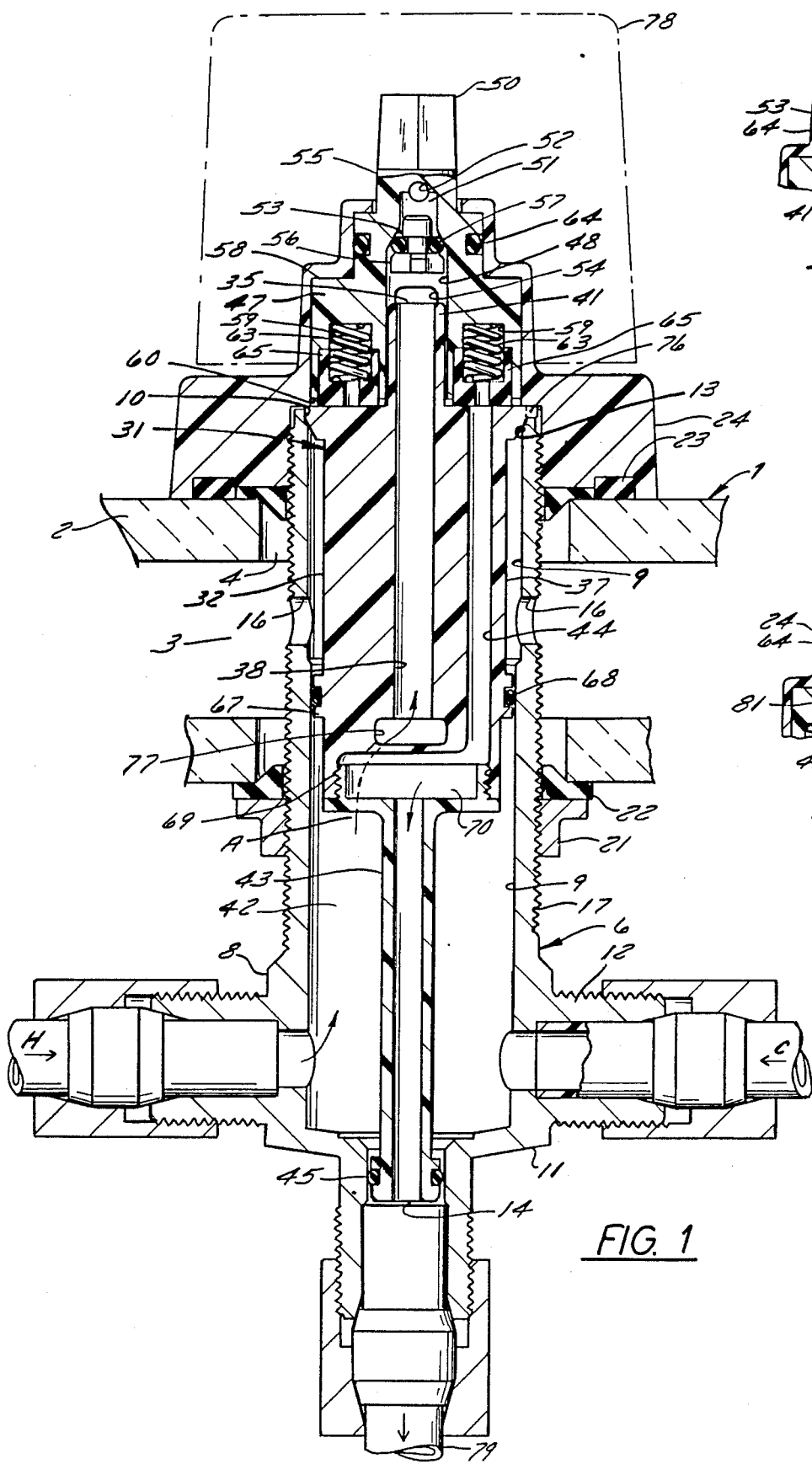
FIG. 1 is a sectional view of the bidet valve shown in an installed position on the rim of the bidet bowl.
Figure 3:
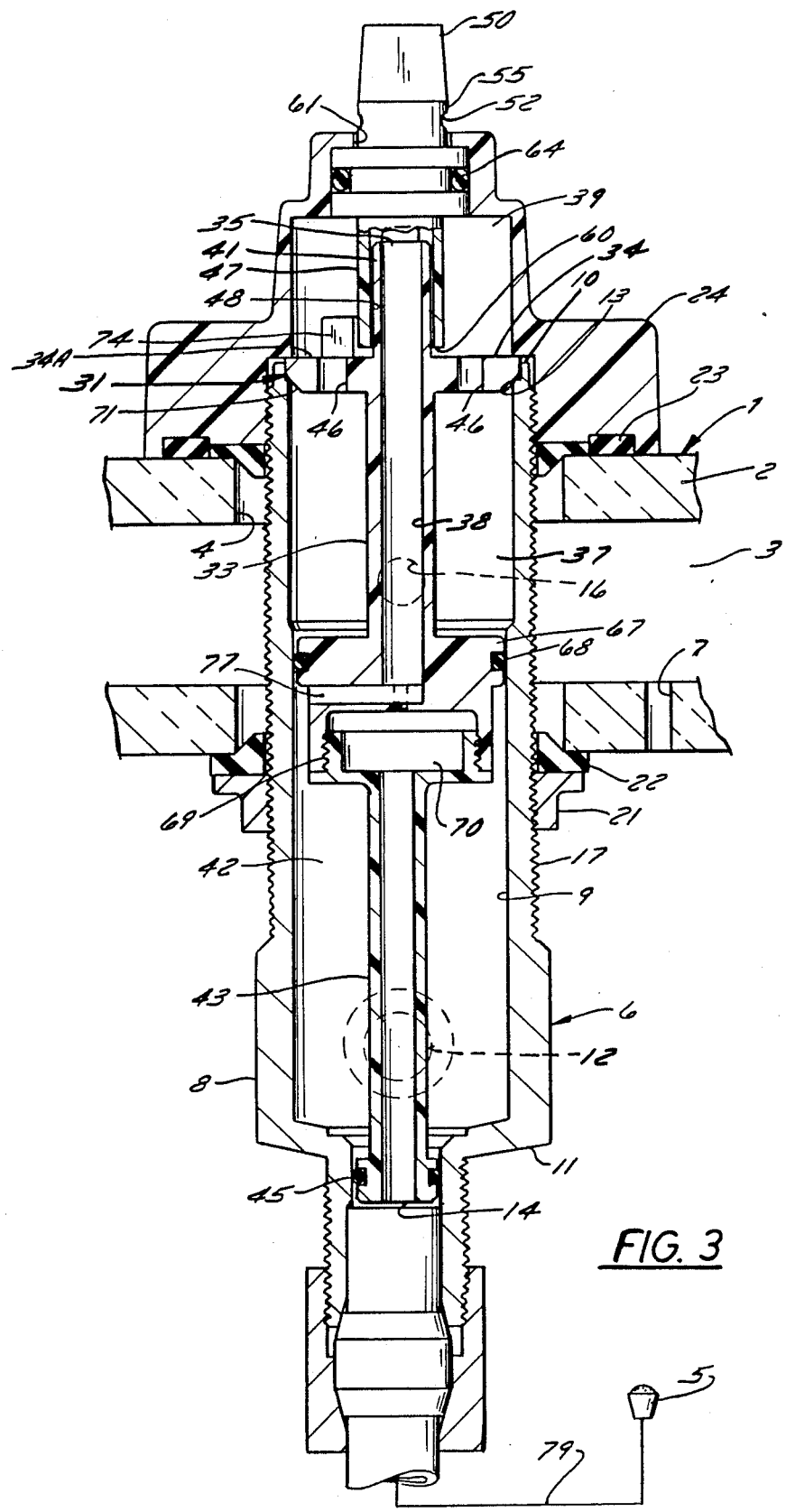
FIG. 3 is a sectional view of the bidet valve shown in FIG. 1 with the plane in which the section is taken orientated 90° from the plane in which the section of FIG. 1 is taken.

FIGS. 1 and 3 show a portion of a bidet bowl 1. The bidet bowl has a bowl rim 2 containing a peripheral fluid conveying rim wash passage 3. The rim 2 has a plurality of openings 7 through which water flows from passage 3 to wash the sides of the bidet bowl 1. The bidet bowl also includes a spray head 5 shown diagrammatically in FIG. 3. The bidet rim 2 has a rim opening 4 in which a bidet valve 6 is mounted for the purpose of controlling the flow of water to either the spray head 5 or the bidet rim passage 3 for the purpose of providing a rim wash for the bidet bowl 1.

The bidet valve 6 comprises a housing 8 having an axially extending bore 9 presenting an open upper stem end 10, a lower end 11 and an external threaded portion 17. The open upper end 10 has an internal seat 13. A lower rim nut 21 and a sealing washer 22 are placed on the threaded portion 17 of the valve housing 8. The housing 8 with the rim nut and sealing washer thereon is inserted through the opening 4 and an upper sealing washer 23 is placed over the open upper stem end 10 of the housing 8. A closure member in the form of a bonnet nut 24 is placed over an exterior portion 55 of a stem means 50 and is threaded onto the open upper end 10 to compress the upper and lower sealing washers 22, 23 against the rim 2 to secure the valve housing in the bidet bowl. The closure member 24 when installed defines a diverting chamber or zone 39 (FIG. 3) as will be more fully described hereinafter.

The valve housing 8 is provided with an inlet means 12 in the form of hot and cold water inlets H and C and first and second discharge openings 14, 16.

The valve 8 also includes a cartridge assembly 31 which controls the flow of water from the inlet means 12 through the valve. The cartridge assembly 31, best shown in FIG. 4, will now be described. The cartridge assembly 31 is dimensioned to be inserted through the open upper end 10 of the housing bore 9. The cartridge assembly 31 includes a spool element 32 having an axially extending body portion 33 presenting first and second axially spaced apart ends 34, 36 defined by first and second lands 66, 67. The first land has a tapered seating surface 71 adapted to be placed in sealing relation to the internal seat 13 in housing 8. The second land 67 is provided with an O-ring 68, the function of which will be more fully explained hereinafter.

The axially extending body portion 33 has a fluid inlet passage 38 and first and second fluid outlet passages 44, 46. The first and second axially spaced apart lands 66, 67 of the body portion define therebetween a fluid outlet chamber or zone 37, best seen in FIG. 1. A first duct 41 extends axially away from the first end 34 and a second duct 43 extends axially away from the second end 36. The second duct 43 comprises a conduit member having one end which is enlarged to present a threaded flange 69 threaded into a tapped aperture at the second end 36 of the body portion 33 to provide a cylindrical intermediate outflow chamber 70 (FIG. 3) adjacent the second end 36 of the body portion 33. The other end of the conduit member 43 is provided with an O-ring 45. The fluid inlet passage 38 is coaxial with the first and second ducts 41, 43 and extends through the second land member 67 where it opens into a radially extending channel 77, best shown in FIGS. 4 and 7. The radially extending channel 77 lies between the second land 67 and the cylindrical intermediate outflow chamber 70 and provides for fluid communication between an inlet zone or chamber 42 surrounding second duct 43 and the diverting zone or chamber 39 surrounding the first duct 41.

The first end 34 of the spool 32 has a fluid admitting opening 35 constituted by the open end of first duct 41; first and second fluid outtake ports 72 and 73 connected to the first and second fluid outlet passages 44, 46, respectively; a stop member 74; and a key means 76. The function of the stop member 74 and key means 76 will be more fully described hereinafter.

A diverter member 47 is rotatably mounted on the body portion 33. The diverter member 47 includes a housing 58 having a central vacuum breaker stem chamber 51 (FIG. 1) therein and a pair of radially offset blind bores 59. The upper portion of the diverter housing 58 is provided with an annular groove for the purpose of receiving an O-ring 64. Preferably the diverter has a recess 48 for rotatably mounting the diverter on first duct 41 but the diverter could have a depending hollow shaft rotatably received in passage 38. The housing 58 has an end surface 60 mounted in facing relation to the end surface 34A of first end 34 of the spool element 32. The diverter housing 58 further includes the stem means 50 and its exterior portion 55 on which a handle 78 is mounted for rotating the diverter member 47. An air inlet 52 is provided in the exterior portion 55 of the stem means 50 to admit atmospheric air into the vacuum breaker chamber 51. The vacuum breaker chamber 51 has a vacuum breaker outlet opening 53 that places it in fluid communication with the diverting zone or chamber 39 via a diverting port 54. The diverter member also has seal means 62 for the purpose of alternately closing either the first or second fluid outlet passages 44, 46 on the first end 34 of the body portion 33 when the diverter member is rotated between first and second positions as defined by the stop member 74. The seal means 62 comprises cylindrical seal elements 65 slidably mounted in blind bores 59 provided in diverter member 47. The seal elements are urged outwardly from the diverter member by a pair of compression springs 63 into sealing relationship with the end face of first end 34 to seal either the first fluid outtake port 72 of outlet passage 44 or the second fluid outtake port 73 of outlet passage 46. A vacuum breaker poppet valve 56 having an O-ring 57 mounted thereon is slidably mounted in the vacuum breaker stem chamber 51 for movement upwardly into closing relation with the air inlet 52.

The valve is assembled by inserting the cartridge assembly 31 into the open upper stem end 10 of the valve housing 8. The cartridge is inserted axially until first land 66 comes in contact with the upper end 10 of the housing 8. The body portion 33 is then rotated until the key means 76 drops into a keyway provided in the upper end 10 and O-ring 45 seats in the opening 14. The diverter member 47 with the vacuum breaker poppet valve 57 and seal means 62 therein projects above the end 10 of housing 8. The bonnet nut 24 is put in place with the stem means 50 passing through bonnet nut opening 61 and is threaded onto the housing 10 as previously described. The O-ring 64 prevents fluid from leaking upward along stem means 50. The tapered seating surface 71 is forced into sealing relation with seat 13 to thus define the fluid diverting chamber or zone 39. The O-ring 68 is slidably received in the bore 9 and in cooperation the seal between tapered surface 71 and seat 13 defines the fluid outlet chamber or zone 37. The O-ring 68 in cooperation with O-ring 45 provides a sealed inlet chamber or zone 42. To complete the installation, the hot and cold water lines H and C are connected to the inlet means 12 adjacent the lower end 11 of the valve housing 8. In addition, the spray head 5 is connected by suitable conduit means 79 to the first discharge opening 14.

The operation of the valve will now be described. In operation, conventional flow control valves, not shown, are opened to admit water into hot and cold conduits H and C. The hot and cold water passes into the inlet chamber or zone 42 which functions as a blending zone wherein the hot and cold water is blended together. The blended water then passes into radial channel 77 and flows upwardly as indicated by arrow A in FIG. 1 through the fluid inlet passage 38 and into the diverting chamber or zone 39. Preferably the fluid admitting opening 35 will be at a critical level of at least one inch above the overflow of the bidet rim when installed and, of course, opening 35 could be as high as required. The pressure of the water in the stem chamber 51 will force the poppet float valve 57 upwardly to seal the air inlet passage 52. Water will then flow out of diverting port 54 into the diverting chamber or zone 39. When the diverter member 47 is rotated to place housing portion 58A against stop 74, outtake ports 73 are closed and water flows through the first fluid outlet passage 44. When diverter member 47 is rotated to place housing portion 58B against stop 74, outtake port 72 is closed and water flows through the second fluid outlet passages 46. The key means 76 locks the spool element 32 in a fixed position relative to housing 8 and prevents rotation of the spool element when diverter member 47 is rotated between its first and second positions. Therefore, depending on the position of the diverter member 47, water will pass through either the first fluid outlet passage 44, the second duct 43 and out the first discharge opening 14 to the spray head 5 or water will pass through second fluid outlet passages 46 and into the fluid outlet chamber or zone 37. The water from the fluid outlet zone 37 will pass through the second discharge opening 16 into the bidet rim passage 3 from which it will flow outwardly through a plurality of the small openings 7 to provide a rim wash for the bidet bowl.

Figure 2:
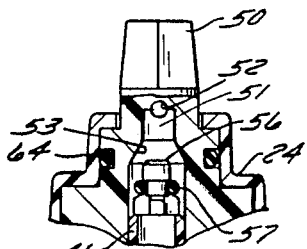
FIG. 2 is a partial sectional view of the bidet valve shown in FIG. 1 showing a vacuum breaker poppet valve in an open position.

In the event of malfunction, such as a break in the water supply lines which would create a suction causing back-siphoning of fluid therethrough, the vacuum breaker poppet valve 56 will drop to the position shown in FIG. 2, thus immediately opening air inlet port 52 and allowing air to flow into the vacuum breaker stem chamber 51 and through the outlet 53 thereof into the diverting chamber 39 to break the vacuum and prevent any contaminated fluid from being siphoned back from the bidet bowl into the potable water supply.

Figure 8:
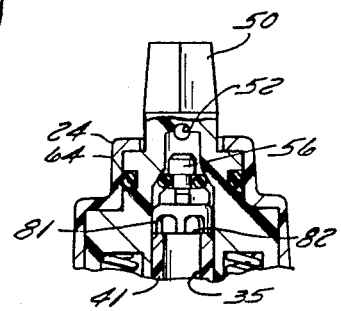
FIG. 8 is a partial sectional view of the bidet valve shown in FIG. 1 showing another embodiment of the vacuum breaker poppet valve.

A second embodiment of the invention is shown in FIG. 8 and discloses a bidet valve which is convertible to either provide or not provide a vacuum breaker function. The valve of the second embodiment is constructed in an identical manner to the valve shown in the first embodiment of FIGS. 1–7 and includes all of the components shown in these figures. To make the valve convertible, a spacing element 81 is inserted between the upper end 82 of first duct 41 and the vacuum breaker poppet valve 56. When the bonnet nut 24 is tightened, the spacing element 81 will force the vacuum breaker poppet valve 56 upwardly to permanently seal the stem chamber outlet 53.

If it is desired to convert the bidet valve back to a vacuum breaker bidet valve it is a simple manner to unscrew bonnet nut 24, lift diverter member 47 up and take out the spacing element 81, thus again permitting the vacuum breaker poppet valve 56 to float freely within the vacuum breaker stem chamber 51.

The bidet valve can also be made to be convertible by providing a removable sealing plug for air inlet 52 or other means may be provided for sealing the stem chamber from the diverting chamber 39.

If it is desired, it is possible to manufacture a non-convertible bidet valve wherein the diverter member is constructed without an air inlet 52 in which event the vacuum breaker poppet valve 56 is completely eliminated from the assembly.

The servicing of the valve of either embodiment is simple. With either embodiment, the bonnet nut 24 is removed thus exposing the cartridge assembly 31. The entire cartridge assembly is slid axially out of the housing bore 9 and replaced by a new cartridge element. If the spool element 33 and the upward facing surface of first end 34 is in good condition, all that would be necessary would be to replace the seal means 62 in the diverter member 47 in order to recondition the valve. However, under normal conditions, replacement of the entire cartridge assembly would be the most reliable and efficient way to recondition the valve.

With reference to the foregoing, the present invention provides an improved, simplified bidet valve. If desired, the bidet valve may be provided with an integral vacuum breaker therein. In a second embodiment, the bidet valve may be converted quickly from non-vacuum breaker to vacuum breaker operation as may be required at the time of installation or subsequent to installation of the valve. The embodiments shown are by way of example and not as a limitation as the disclosure will suggest modifications and changes to those skilled in the art that fall within the scope of the disclosed invention.

What is claimed is:

1. A replaceable cartridge for insertion into an axially extending bore of a bidet valve housing for control of fluid flowing through said valve housing, said cartridge comprising:
   a spool element (32) including a body portion (33) having an axial extent and first and second ends (34, 36);
   a fluid outlet zone (37) between said first and second ends;
   a diverting zone (39) adjacent said first end; a fluid admitting opening (35) in said diverting zone;
   a fluid inlet zone (42) adjacent said second end;
   a fluid inlet passage (38) in said body portion in fluid communication between said diverting zone fluid admitting opening and said fluid inlet zone;
   a first fluid outlet passage (44) having a first discharge opening (14), said first fluid outlet passage connected in fluid communication between said diverting zone and said first discharge opening;
   a second fluid outlet passage (46) connected in fluid communication between said diverting zone and said fluid outlet zone;
   a diverter member (47) rotatably mounted on and supported by said spool element body portion in said diverting zone adjacent said first end and having,
      a stem means (50) for rotating said diverter member,
      a vacuum breaker chamber (51),
      an air inlet (52) into said vacuum breaker chamber,
      a vacuum breaker outlet opening (53) connecting said vacuum breaker chamber with said diverting zone, and
      a diverting port (54) connecting said vacuum breaker chamber with said diverting zone;
   a seal means (62) on said diverter member for alternately closing either said first or said second fluid outlet passages; and
   a vacuum breaker valve (56) mounted in said vacuum breaker chamber for movement into closing relation with said air inlet.

2. A replacement cartridge according to claim 1 wherein said fluid admitting opening includes a first duct (41) extending axially away from said first end into said diverting zone and said fluid outlet passage (44) includes a second duct (43) projecting axially away from said second end into said inlet zone.

3. A replacement cartridge according to claim 2 wherein said first duct (41), said second duct (43) and said fluid inlet passage (38) are coaxial.

4. A replacement cartridge according to claim 1 wherein said first and second ends have first and second axially spaced annular lands (66, 67), respectively, defining said fluid outlet zone therebetween.

5. A replacement cartridge according to claim 1 wherein said diverter member (47) has an end surface (60) in facing relation to said first end (34) and wherein said seal means are mounted on said end surface.

6. A non-rise bidet valve comprising:
   a housing (8) having fluid inlet means (12), and first and second fluid discharge openings (14, 16);
   a fluid diverting chamber (39) having a fluid admitting opening (35), and first and second fluid outtake ports (72, 73);
   a fluid inlet passage (38) connecting said fluid inlet means in open fluid communication with said fluid admitting opening of said diverting chamber;
   a first fluid outlet passage (44) connecting said first outtake port with said first discharge opening;
   a second fluid outlet passage (46) connecting said second outtake port with said second discharge opening; and
   a diverter member (47) mounted in said diverting chamber for movement between first and second positions and having
      a stem means (50) presenting an exterior portion extending outside said housing for moving said diverter member between said first and second positions,
      seal means (62) on said diverter member for movement therewith to close one of said fluid outtake ports and open the other of said outtake ports when said diverter member is in said first position, and to close the other of said fluid outtake ports and open said one outtake port when said diverter member is moved to said second position to enable selective diversion of fluid entering said diverting chamber to either said first or second discharge opening during use,
      a vacuum breaker stem chamber (51) having an air inlet (52) connecting said stem chamber in open communication with atmosphere, and a stem chamber outlet (53) connecting said stem chamber in fluid communication with said diverting chamber,
      a vacuum breaker valve (56) in said diverting member for movement into closing relation with said air inlet in response to fluid pressure in said diverting chamber and into open relation relative to said air inlet to admit atmospheric air into said stem chamber and diverting chamber in response to vacuum at said fluid admitting opening to prevent reverse flow siphoning of fluid from said first and second discharge openings back through either said first or second outtake port, and
      a spacer element (81) removably mounted in said diverter member to hold said vacuum breaker valve in closing relation to said air inlet at all times, said spacer element being removable to convert said bidet valve to a vacuum breaker operation when required.

7. A non-rise bidet valve comprising:
   a housing (8) having a bore (9) extending therethrough, a stem end (10), fluid inlet means (12), and first and second fluid discharge openings (14, 16);
   a closure member (24) including a stem opening (61) mounted on said stem end to define a fluid diverting chamber (39) in said bore having a fluid admitting opening (35), and first and second fluid outtake ports (72, 73);
   a fluid inlet passage (38) connecting said fluid inlet means in open fluid communication with said fluid admitting opening of said diverting chamber;
   a first fluid outlet passage (44) connecting said first outtake port with said first discharge opening;
   a second fluid outlet passage (46) connecting said second outtake port with said second discharge opening;
   a diverter member (47) mounted in said diverting chamber for movement between first and second positions and having a stem means (50) presenting an exterior portion extending through said stem opening to the outside of said housing for moving said diverter member between said first and second positions, and seal means (62) on said diverter member for movement therewith to close one of said fluid outtake ports and open the other of said outtake ports when said diverter member is in said first position, and to close the other of said fluid outtake ports and open said one outtake port when said diverter member is moved to said second position to enable selective diversion of fluid entering said diverting chamber to either said first or second discharge opening during use; and a cartridge assembly mounted in said bore, said cartridge assembly including, a spool element (32) including an axially extending body portion (33) having first and second ends (34, 36), said fluid inlet passage (38) and said first and second fluid outlet passages (44, 46) being in said body portion, first and second spaced apart lands (66, 67) on said body portion defining, in cooperation with said bore, a fluid outlet chamber (37) therebetween and a fluid inlet chamber (42) adjacent said second end, said first end having said fluid admitting opening (35) and said first and second outtake ports (72, 73) therein, said first fluid outlet passage connecting said first outtake port in fluid communication with said first discharge opening and said second fluid outlet passage connecting said second outtake port in fluid communication with said fluid outlet chamber, said diverter member which is rotatably mounted on said body portion in facing relation to said first end, said diverter member further including a vacuum breaker stem chamber (51) in fluid communication with said diverting chamber and having an air inlet (52) connecting said stem chamber in open communication with atmosphere, and a vacuum breaker valve (56) mounted in said stem chamber for movement into closing relation with said air inlet in response to fluid pressure in said diverting chamber and for movement into a position which opens said air inlet to admit air into said stem chamber and diverting chamber in response to vacuum at said fluid admitting opening.

8. A non-rise bidet valve according to claim 7 wherein said fluid inlet passage (38) includes a first duct (41) projecting axially from said first end of said body portion into said diverting chamber, said diverter member includes a first recess (48) for rotatably receiving said first duct therein, a diverting port (54) connects said first recess in fluid communication with said diverting chamber, and said stem chamber (51) extends axially away from said first recess with said vacuum breaker valve in coaxial alignment with said first duct.

9. A non-rise bidet valve according to claim 8 wherein said first fluid outlet passage (44) includes a second duct (43) projecting axially from said second end of said body portion and through said fluid inlet chamber into said first discharge opening.

10. A non-rise bidet valve according to claim 9 wherein said fluid inlet chamber includes a blending zone surrounding said second duct and wherein said fluid inlet means 12 includes first and second fluid inlets (H, C) which are in fluid communication with said blending zone.

11. A non-rise bidet valve according to claim 9 wherein said fluid inlet passage and said first and second ducts are all in coaxial alignment with each other.

* * * * *